United States Patent [19]

Konishi et al.

[11] Patent Number: 4,476,509

[45] Date of Patent: Oct. 9, 1984

[54] THIN FILM MAGNETIC HEAD AND METHOD OF MANUFACTURING THE SAME

[75] Inventors: Katsuo Konishi; Kanji Kawano, both of Yokohama; Kohji Tamura, Ebina; Mitsuo Abe, Odawara, all of Japan

[73] Assignee: Hitachi, Ltd., Tokyo, Japan

[21] Appl. No.: 349,529

[22] Filed: Feb. 17, 1982

[30] Foreign Application Priority Data

Feb. 20, 1981 [JP] Japan .................................. 56-23006
Jan. 27, 1982 [JP] Japan .................................. 57-9989

[51] Int. Cl.³ .............................................. G11B 5/25
[52] U.S. Cl. ..................................... 360/119; 360/125
[58] Field of Search ................. 360/119, 120, 125–127

[56] References Cited

U.S. PATENT DOCUMENTS 4,127,884 11/1978 Nouchi et al. ................. 360/127 X

FOREIGN PATENT DOCUMENTS 55-132519 10/1980 Japan .................................. 360/119

OTHER PUBLICATIONS

IBM/TDB vol. 15, No. 10, Mar. 1973, "Narrow Track Thin film Recording Head" by Klein.

Primary Examiner—John H. Wolff
Attorney, Agent, or Firm—Antonelli, Terry & Wands

[57] ABSTRACT

A thin film magnetic head is composed of a first thin film of a magnetic material deposited on a non-magnetic substrate. A V-like groove is formed in the first magnetic thin film with a depth reaching the non-magnetic substrate. One wall face of the V-like groove is deposited with a non-magnetic thin film, and the V-like groove is filled with a second magnetic thin film. A magnetic gap provided by the non-magnetic thin film is used as the magnetic head gap.

10 Claims, 19 Drawing Figures

INCIDENT ANGLE OF ION BEAM

THIN FILM MAGNETIC HEAD AND METHOD OF MANUFACTURING THE SAME

BACKGROUND OF THE INVENTION

1. Field of the Invention

The present invention relates generally to a magnetic head for use in video tape recorders (VTR) and the like, and more particularly concerns the magnetic head implemented through a magnetic thin film technique and a method of manufacturing the same.

2. Description of the Prior Art

In recent years, there has been a consistent demand for a magnetic head for use in VTR or the like applications which meet the requirements of a short gap length, a narrow track width, compatibility with a high coercive tape and others for attaining a high density in the recording of data or information, and various magnetic heads have been proposed which are implemented by using magnetic thin films of soft magnetic metals such as Sendust, Permalloy and the like as the materials for the head core to fulfill the requirements mentioned above.

One of methods of forming the magnetic gap of such magnetic head is realized by resorting to a thin film technology for attaining a high precision in implementation of the magnetic gap, being different from hitherto known methods of fabricating conventional ferrite heads. The thin film technology allows a step of abutting and bonding core halves to be spared, which step provides a dominant influential factor to the yield of magnetic heads fabricated on a mass production base, whereby the magnetic head of a narrow gap and a narrow track can be, on principle, realized effectively.

When the thin film magnetic head for VTR having a track width of several tens $\mu$m is to be manufactured through the thin film technique, the magnetic thin films of the materials described above are not suited for realizing the magnetic head of high performances, because of low electric resistivity of these materials, involving a significantly large eddy current loss in the processing signals of a high frequency band. For example, when a magnetic head for VTR destined to deal with signals of MHz in frequency is to be realized with the magnetic core thereof being constituted by a thin film of Sendust, the film thickness has to be smaller than 10 $\mu$m and should preferably be smaller than 5 $\mu$m in view of the eddy current loss which would otherwise occur in the above frequency band. As the consequence, it is impossible to realize the high performance magnetic head having the track width of several tens $\mu$m with the structure of a single thin film layer.

In the light of the situations mentioned above, a head structure in which a number of thin films are laminated has heretofore been adopted. However, in the hitherto known multi-layer thin film magnetic head, a inter-layer insulation film interposed between the magnetic laminar films extends in parallel with the magnetic gap, and a portion of the insulation film remains unremoved even after useless portions of the core have been polished away and operates as an additional magnetic gap (termed the pseudo-magnetic gap), to a great disadvantage, as will hereinafter be described in detail.

SUMMARY OF THE INVENTION

An object of the present invention is to provide a thin film magnetic head of a multi-layer structure for VTR which has a short gap length and scarcely undergoes any substantial eddy current loss ascribable to high frequency signals and which can be fabricated in a facilitated manner.

Another object of the present invention is to provide a thin film magnetic head of a multi-layer structure for VTR having a magnetic flux constricting configuration in which the core width is decreased or restricted at a region lying in the vicinity of the magnetic gap.

Still another object of the present invention is to provide a novel structure of the thin film magnetic head which is suited for the manufacture on a mass production basis with a high yield and provide a method of manufacturing the same.

In view of the above objects, there is proposed according to an aspect of the invention a thin film magnetic head which comprises a substrate formed of a non-magnetic material, a first magnetic thin film formed on the substrate, a groove formed in the first magnetic thin film at a predetermined region with a depth reaching the non-magnetic substrate, a non-magnetic thin film formed on at least one wall of the groove, and a second magnetic thin film embedded in the groove, wherein the first and second magnetic thin films constitute a core of the magnetic head, while one of gaps formed by the non-magnetic thin film is used as a magnetic gap of the magnetic head.

According to another aspect of the present invention, there is proposed a thin film magnetic head which comprises a non-magnetic substrate, a first magnetic thin film formed on a surface of the substrate and having a first groove of which one wall constitutes a magnetic gap wall at a gap position of a finally finished magnetic head core and which has a depth reaching at least the surface of the substrate so that a portion of the first magnetic thin film located on one side of the first groove constitutes a main magnetic path for a half of the magnetic head core, while the other portion of the first magnetic thin film located on the other side of the first groove constitutes an auxiliary magnetic path for the other half of the magnetic head core, a non-magnetic thin film formed on the surface of the first magnetic thin film and the wall surface of the first groove, a second magnetic thin film formed on the surface of the non-magnetic thin film and having a second groove whose depth at the position of the magnetic head gap reaches at least the surface of the portion of the first magnetic thin film which constitutes the main magnetic path, the second magnetic thin film having one portion which constitutes an auxiliary magnetic path for the one half of the magnetic head core and the other portion which constitutes a main magnetic path for the other half of the magnetic head core, the second groove being interposed between the main and the auxiliary magnetic path portions of the second magnetic thin film, wherein the magnetic head gap is formed between opposite end faces of the main magnetic path portions of the first and second magnetic thin films with the non-magnetic thin film being sandwiched between the opposite end faces.

In a preferred embodiment of the present invention, at least one of the first and the second magnetic thin films is realized in a multi-layer structure including two or more laminar films, whereby a thin film magnetic head having a track width of several tens $\mu$m can be obtained.

In another preferred embodiment of the present invention, the first groove has a V-like cross-section with the bottom apex thereof reaching the surface of the substrate. However, the V-like groove may have the bottom apex portion which extends into the interior of the substrate. In general, one wall of the V-like groove should preferably be flat, because it is generally used as the active part of the magnetic head gap.

The thin film magnetic head according to the invention is of such a structure that the volume of core material is significantly reduced as compared with the surface area of the core, whereby the eddy current loss described hereinbefore can be suppressed to a minimum. Even when a gap (pseudo-gap) is formed in the magnetic core in addition to the intrinsic magnetic gap, the adverse influence of such additional or pseudo-gap to the signal read-out operation due to the azimuth loss effect can be excluded, since both gaps do not extend in parallel to each other. On the other hand, in the case of the recording operation, arrangement may be made such that the recording of signal on a tape can be effected by the gap located downstream as viewed in the feeding direction of the tape so that the signal possibly recorded by the preceding gap is positively erased.

According to a further aspect of the present invention, there is provided a method of manufacturing a thin film magnetic head, which comprises steps of depositing a first magnetic thin film on a surface of a non-magnetic substrate, forming a first groove of V-like cross-section in the first magnetic thin film at a position where the active magnetic gap is finally to be implemented, the groove having a depth reaching the surface of the non-magnetic substrate, depositing a non-magnetic film on one inclined wall of the V-like groove for defining the gap length, depositing further a second magnetic thin film, forming subsequently a second groove having a depth which reaches the non-magnetic film constituting the magnetic head gap and extending in parallel with the V-like groove, depositing a protection film, forming a winding hole at a desired location and providing a winding.

In a preferred manner for carrying out the method according to the invention, an ion etching process is made use of for forming the second groove. For effecting the ion etching in the most advantageous manner, the wall face of the V-like groove which is disposed in opposition to the wall destined to constitute a part of the active head gap is inclined at an angle of not greater than 20° relative to the non-magnetic substrate and an ion beam is projected in parallel to the inclined wall face.

DESCRIPTION OF THE PREFERRED EMBODIMENTS

Figure 1:
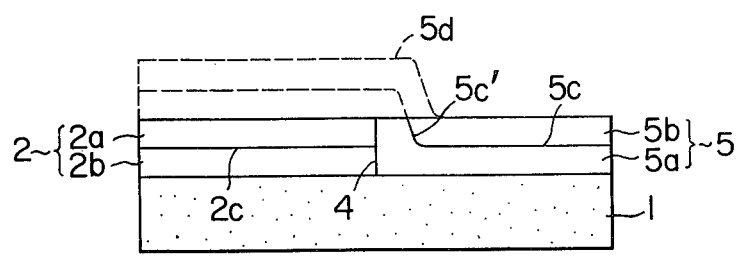
FIG. 1 is a side view of a hitherto known thin film magnetic head to illustrate an arrangement of a slide face thereof.

For having a better understanding of the invention, problems which the hitherto known thin film mangetic heads suffer will first be described by referring to FIG. 1. In this figure, a reference numeral 1 designates a non-magnetic substrate over which a magnetic thin film 2 is first deposited to constitute one of core halves. A numeral 4 designates a gap formed of a non-magnetic thin film, and a numeral 5 denotes a magnetic thin film which is second deposited on the non-magnetic substrate 1 and constitutes the other core half. For formation of the magnetic thin film 5, a useless portion of the magnetic thin film 2 first deposited on the substrate 1 is removed by etching, polishing or the like process, which is followed by deposition of a non-magnetic thin film layer of a desired thickness. Subsequently, the magnetic thin film 5 is formed in the manner similar to the formation of the magnetic thin film 2, and a portion 5d of magnetic thin film 5 which overlies the first magnetic thin film 2 is removed by polishing to such a degree that the surface of the magnetic thin film 2 is exposed.

In the case of the magnetic head structure illustrated in FIG. 1, both of the magnetic thin films 2 and 5 are composed of two laminated layers 2a; 2b and 5a; 5b, respectively, in order to reduce the eddy current loss. To this end, it is required to interpose inter-layer insulation films 2c and 5c between the film layers 2a and 2b and between the film layers 5a and 5b, respectively. Then, a portion 5c' of the inter-layer insulation film 5c remains extending substantially in parallel with the magnetic gap 4 and will operate as a pseudo-magnetic gap, providing a great obstacle to the attainment of desired performance of the thin film magnetic head.

Now, the invention will be described in detail in conjunction with exemplary embodiments thereof.

Figure 2:
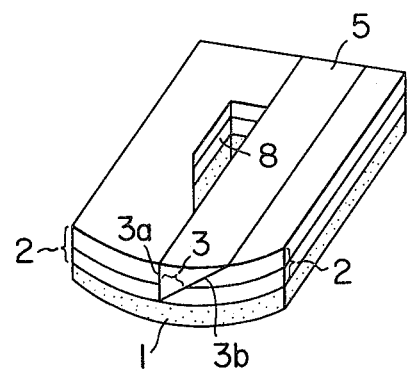
FIG. 2 shows in a perspective view a thin film magnetic head according to an exemplary embodiment of the present invention.

Referring to FIG. 2 which shows in a perspective view a thin film magnetic head according to an embodiment of the invention and in which like parts as those shown in FIG. 1 are designated by same reference symbols, there is formed a groove 3 of a V-like cross-section which has side walls 3a and 3b disposed in opposition to each other, the wall 3a being destined to constitute a magnetic gap. A recess 8 is formed for accommodating a winding. The magnetic thin film 2 constituting a part of a core is composed of two laminar layers each having a thickness of 10 μm and formed of Sendust (an alloy having a high permeability) by sputtering. There is interposed between the two layers of the magnetic thin film 2 an insulation thin film having a thickness of 0.3 µm and formed of $SiO_2$ by sputtering. The V-like groove 3 is cut in the magnetic thin film 2 by means of a diamond blade so that an angle of 60° is formed between the groove walls 3a and 3b. Of course, the angle is not restricted to this value but can be determined in consideration of wavelength of signal recorded on a magnetic tape, azimuthal loss, desired S/N ratio of the signal, eddy current loss in the magnetic thin film 5 buried in the V-like groove 3 and other factors. For formation of the magnetic thin film 5, the V-like groove 3 is first deposited with $SiO_2$ by sputtering in thickness of 0.5 µm corresponding to the required gap width. Subsequently, the groove 3 is filled with Sendust by sputtering in a thickness of 20 µm. Finally, useless film deposited on the magnetic thin film 2 destined to serve as the core is removed by polishing, to realize the magnetic thin film 5.

The deposition of $SiO_2$ mentioned above is effected by controlling the direction of sputtering such that $SiO_2$ film can be positively deposited on the wall 3a destined to serve as the inherent magnetic gap while deposition of $SiO_2$ on the wall 3b is suppressed to a possible minimum. In the case of the illustrated structure of the thin film magnetic head, the thickness of $SiO_2$ film formed on the magnetic gap wall 3a was 0.5 µm, while the thickness of $SiO_2$-film formed on the groove wall 3b was in the order of 0.2 µm or less. It goes without saying that the thickness of $SiO_2$-film deposited on the groove wall 3b should preferably be zero, which is favorable to the passage of signal fields through the core. Practically, the recording and reproducing capability of the gap wall portion 3b can be neglected when compared with that of the intrinsic magnetic gap formed on the groove wall 3a.

The thickness of the magnetic thin film 5 which amounts to 20 µm at the gap portion 3a will be itself be likely to involve the eddy current loss. However, by virtue of a triangular cross-section of the magnetic film 5 and a reduced dimension thereof in the absolute sense, falling within a so-called skin depth, there will arise no substantial problem of the eddy current loss. Of course, the magnetic thin film 5 may be formed of two layers. Further, increase in reluctance of the core due to the presence of the gap wall portion 3b can be made utterly insignificant by virtue of such arrangement that the thickness of $SiO_2$-film deposited on the wall 3b can be made minimum by appropriately controlling the sputtering direction as mentioned above, the intrinsic gap portion 3a is inclined with an extremely high steepness as compared with the gap wall portion 3b, and that area of the wall portion 3b is made considerably greater than that of the intrinsic gap wall portion 3a by forming the hole or recess 8 in the latter for accommodating the winding.

Figure 3:
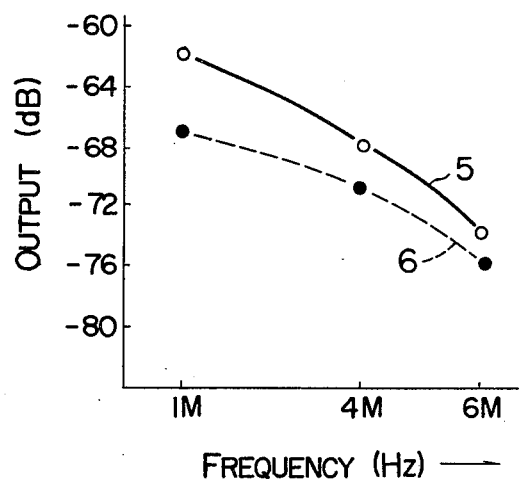
FIG. 3 graphically illustrates a frequency characteristic of a thin film magnetic head of a structure shown in FIG. 2 in comparison with that of a conventional ferrite core head.

In an experiment, a thin film magnetic head of the structure shown in FIG. 2 was operated in combination with a metal tape having a coercive force Hc of 1200 Oe with the tape being fed at a speed of 5.8 m/s, wherein output level was compared with that of a conventional ferrite head. Results are graphically illustrated in FIG. 3. As can be seen from this figure, improvement was been attained as by about 5 dB at a frequency of 1 MHz, 3 dB at 4 MHz and 2 dB at 6 MHz. Further, no adverse influence of the gap portion 3b to the recording and reproducing performance of the thin film magnetic head have been detected.

Figure 4:
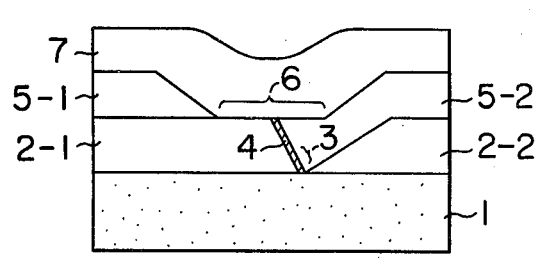
FIGS. 4 and 5 show in side views, respectively, arrangements of slide faces of thin film magnetic heads according to other exemplary embodiments of the invention.
Figure 5:
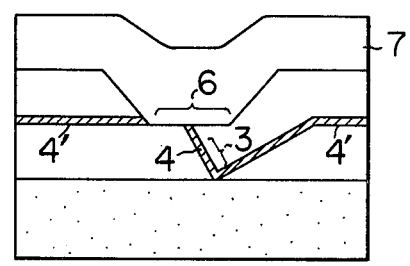

FIGS. 4 and 5 show further exemplary embodiments of the present invention in sectional views, respectively. In these figures, same or equivalent parts as those shown in FIG. 2 are denoted by same reference numerals. The non-magnetic thin film for forming a magnetic gap is denoted by 4. A reference numeral 6 denotes a U-like groove, and 7 denotes a non-magnetic thin film serving as a protection film. In FIG. 4, a reference numeral 2-1 denotes a main magnetic path of one of magnetic head core halves found of the first magnetic thin film and a reference numeral 2—2 denotes an auxiliary magnetic path of the other core half. A numeral 5-1 denotes a main magnetic path of one of magnetic head core halves found of the second magnetic thin film and a reference numeral 5-2 denotes an auxiliary path of the other core half. In FIG. 5, reference numeral 4' denotes non-magnetic thin films which are formed in regions outside of the magnetic gap 4. In these exemplary embodiments, first and second magnetic films 2 and 5 constitute the magnetic core, while the non-magnetic thin film sandwiched between these films 2 and 5 is used as the operative or active magnetic gap. The U-like groove 6 serves to constrict magnetic flux in the magnetic circuit.

Next, referring to FIGS. 6a to 6g, description will be made of a process for realizing the structure illustrated in FIGS. 4 and 5.

Figure 6A:
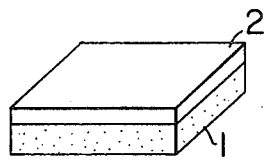
FIG. 6a to FIG. 6g are views to illustrate a process of manufacturing the thin film magnetic head shown in FIG. 4.
Figure 6B:
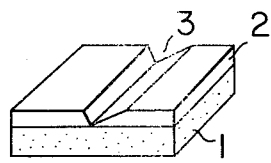
Figure 6C:
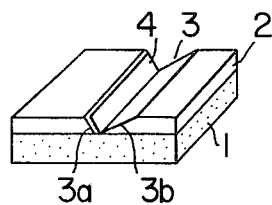
Figure 6D:
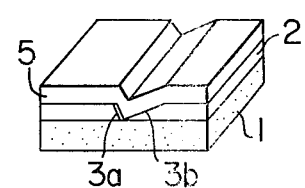
Figure 6E:
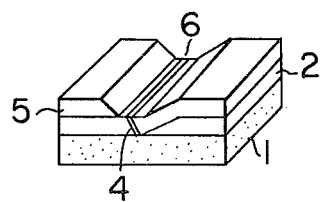
Figure 6F:
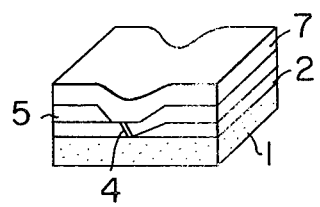
Figure 6G:
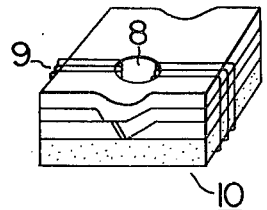
Figure 7:
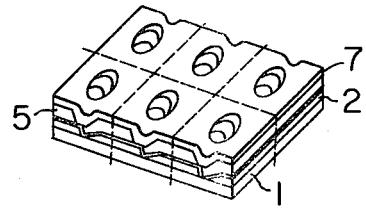
FIG. 7 is a view to illustrate a process for fabricating simultaneously a plurality of the thin film magnetic heads according to the invention.

At first, there is deposited on a substrate 1 of a non-magnetic material the first magnetic thin film 2 in a thickness substantially corresponding to a track width, as is shown in FIG. 6a. At a next step shown in FIG. 6b, a V-like groove 3 is formed in the first magnetic thin film 2 at a location where the operative gap is to be finally formed, with a depth reaching the surface of the substrate 1. At a succeeding step (FIG. 6c), one of the inclined walls or surfaces (i.e. the gap wall 3a in the case of the illustrated embodiment) of the V-like groove 3 is deposited with the thin film 4 of a non-magnetic material such as $SiO_2$ or the like for defining the length of the magnetic gap. Deposition of the non-magnetic film 4 may extend to the other inclined wall surface 3b of the V-like groove and other regions (refer to the structure shown in FIG. 5). At a step illustrated in FIG. 6d, the second magnetic film 5 is deposited in a thickness equal to or greater than the depth of the V-like groove 3. Subsequently, a portion of the second magnetic film 5 located over and in the vicinity of the top portion of the inclined gap wall 3a is removed to form the U-like groove 6 which separates the second magnetic thin film 5 into left and right portions, as illustrated in FIG. 6e. Next, a non-magnetic material 7 is coated over the whole top surface, as shown in FIG. 6f. Finally, a hole or recess 8 for accommodating a winding is formed by an ultrasonic wave processing and a winding 9 is wound, as illustrated in FIG. 6g. Thus, a thin film magnetic head 10 has been completed. In the foregoing, description has been made of a process for realizing a single thin film magnetic head. It will however be appreciated that the process can be equally applied for fabricating simultaneously a number of the thin film magnetic heads on a large size substrate of a non-magnetic material on a batch basis. More specifically, a number of the thin film magnetic heads can be implemented on a single substrate through one and the same process and thereafter individual head chips are obtained by cutting along broken lines shown in FIG. 7.

Among the processing steps illustrated in FIGS. 6a to 6g, the step of forming the U-like groove 6 to implement the magnetic flux constriction and determine definitely the track width (FIG. 6e) is most important. As the method of carrying out this step, there are conceivable a mechanical grinding method using a diamond tool or a grindstone and a chemical etching process. However, these methods can not assure satisfactory dimensional accuracy, involving poor yield. More specifically, deposition of the magnetic thin films 2 and 5 on the non-magnetic substrate 1 will possibly bring about not a little warp or curvature of the substrate 1. Under the circumstances, when the groove 6 is formed linearly by the mechanical grinding method, the depth of the groove 6 will become non-uniform in dependence on the degree of warp, resulting eventually in unevenness of the track width. Further, if adhesion as well as mechanical strength of the magnetic thin films 2 and 5 is not sufficiently high, delamination and/or breakage of these films will frequently occur in the cource of the grinding process. On the other hand, in case the chemical etching method is adopted, a mask corresponding to the configuration of the U-like groove 6 has to be formed in precedence to the selective etching, requiring thus the increased number of steps to complicate the processing. Besides, undercut is inevitable, making it difficult to attain the desired configuration of the groove 6 with a reasonable reproductivity.

Figure 8A:
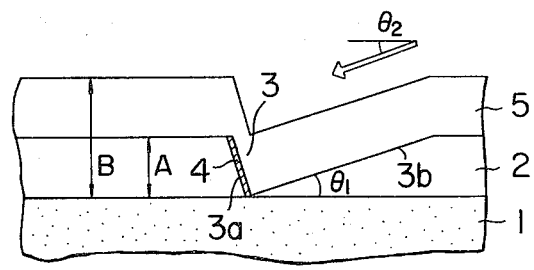
FIGS. 8a and 8b are views to illustrate an ion etching process which may be adopted in carrying out the fabricating step shown in FIG. 6e.
Figure 8B:
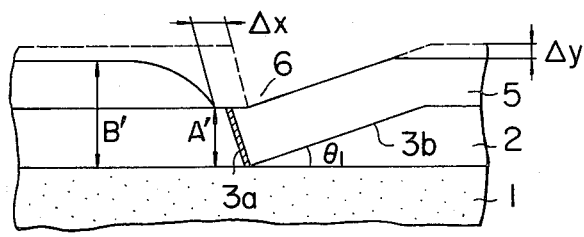

Next, an example of the process which allows the U-like groove 6 to be formed with an improved accuracy will be described. Referring to FIG. 8a which shows a slide surface of a thin film magnetic head in an enlarged fragmental view and in which same parts as those shown in FIGS. 6a to 6g are denoted by same reference numeral, the first magnetic thin film 2 was formed with the V-like groove 3 of good linearity through a cutting process by using a diamond tool, wherein the one inlined wall or surface 3a of the V-like groove was formed at a predetermined azimuth angle so as to serve as the operative gap wall, while the other wall or surface 3b of the V-like groove was imparted with a gentle inclination, wherein an angle $\theta_1$ of the slanted wall 3b relative to the surface of the substrate is selected not greater than 20°. The second magnetic thin film 5 was deposited so as to conform to the configuration of the V-like groove 3. Referring to FIG. 8b, there is shown a configuration of the head slide surface which was resulted after a portion of the second magnetic thin film 5 located in the vicinity of the top portion of the inclined gap wall 3a has been removed in U-like shape by an ion etching method. The ion etching was effected in the atmosphere of argon gas under a pressure of $8 \times 10^{-5}$ Torr at an accelerating voltage of 600 V with a current density of 0.5 mA/cm². The incident angle $\theta_2$ of the ion beam is selected equal to the angle $\theta_1$ formed between the gently inclined wall 3b of the V-like groove 3 and the substrate 1. The ion etching was carried out until the second magnetic thin film 5 was separated into the left and the right portions (as viewed in FIG. 8b) by the U-like groove 6. Thereafter, the non-magnetic film 7 was deposited over the whole top surface, the winding hole 8 was formed and the winding 9 was wound in the manner described hereinbefore in conjunction with FIGS. 6f and 6g.

Next, description will be made of the optimum conditions for the geometry of the V-like groove 3 and the incident angle $\theta_2$ of the ion beam in the ion etching process adopted in the example described above. The first optimum condition resides in that the thickness of the first magnetic thin film 2 and the second magnetic film 5 and the depth of the V-like groove 3 are selected to be equal to one another so that the bottom of the U-like groove 6 formed in the second magnetic thin film 5 lies at the height of the first magnetic thin film 2. Further, the incident angle $\theta_2$ of the ion beam is selected equal to the angle $\theta_1$ of the inclined wall 3b relative to the substrate surface. On these first conditions, the etching can be carried out without bringing about any appreciable displacement of the deepest portion or bottom of the U-like groove, whereby the track width finally attained can be determined only by the thickness of the first magnetic thin film 2 (i.e. A′=A), to allow the track width to be controlled in the most facilitated manner.

Figure 9:
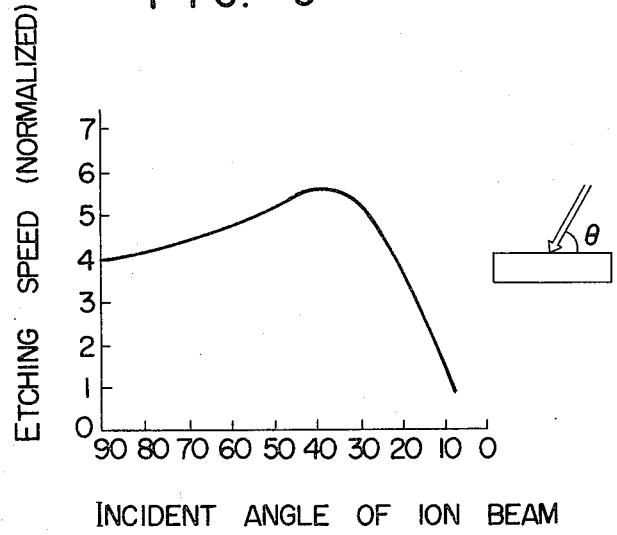
FIG. 9 graphically illustrates dependence of ion etching speed on the incident angle of ion beam in the ion etching process.
Figure 10:
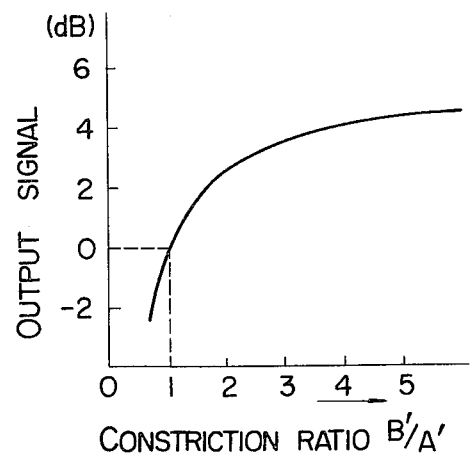
FIG. 10, graphically illustrates a relationship between a constriction ratio as defined and output signal level of the thin film magnetic head shown in FIG. 8b.
Figure 11:
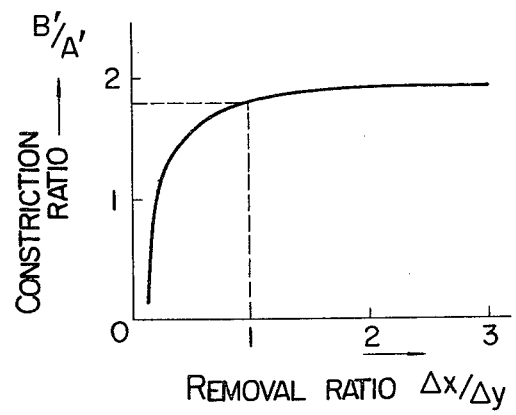
FIG. 11 graphically illustrates a relationship between the constriction ratio and etching rate or speed in the etching process shown in FIG. 8b.
Figure 12:
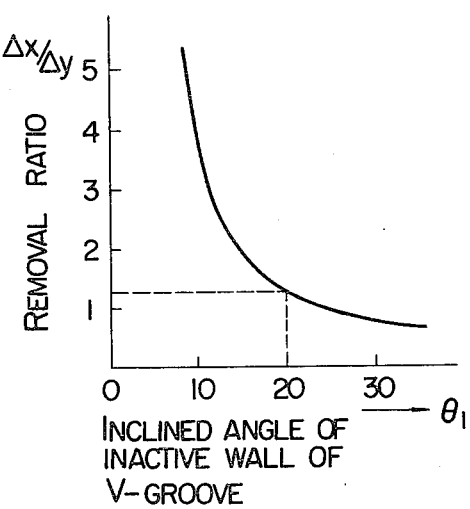
FIG. 12 graphically illustrates a relationship between the etching rate and an angle of inclination of a wall of V-like groove which constitutes no part of the active magnetic gap of the thin film magnetic head shown in FIG. 8b.

The second condition resides in that the angle $\theta_1$ formed by the inclined wall surface 3b of the V-like groove relative to the substrate 1 is selected at a value not greater than 20°, to improve the performance of the magnetic head by taking advantage of the magnetic flux constricting effect. This will be explained by referring to FIG. 9 which illustrates graphically the dependence of the ion etching speed or rate on the incident angle of the ion beam on the basis of the result measured for the thin film formed of Sendust. As can be seen, removed quantities $\Delta x$ and $\Delta y$ of the thin film 5 indicated in FIG. 8b and hence the final configuration of the head are determined definitely by the incident angle $\theta_2$ of the ion beam. It will be noted that, although the track width A′ is equal to the initial value A, the core thickness B′ is decreased from the initial value B by the quantity $\Delta y$. If the ratio between the track width and the core thickness, i.e. B′/A′ is termed the constriction ratio, the output signal derived from the thin film magnetic head increases as a function of the constriction ratio B′/A′, as is graphically illustrated in FIG. 10. It will be seen that the constriction ratio B′/A′ should preferably be selected large. On the other hand, the constriction ratio B′/A′ is determined in dependence on the removed or etched quantities $\Delta x$ and $\Delta y$, and there exists between the constriction ratio B′/A′ and the removal ratio $\Delta x/\Delta y$ such a relationship as graphically illustrated in FIG. 11 for the azimuth angle of 6. The ratio $\Delta x/\Delta y$ of greater than 1 (one) is sufficient. The value of ratio B′/A′ becomes saturated in a range of the ratio B′/A′ of 1.8 to 2. Additionally, the ratio $\Delta x/\Delta y$ depends on the initial shape or configuration of the head structure and in particular on the angle of inclination $\theta_1$ of the V-like groove wall 3b. On the basis of the relationship between the etching speed and the incident angle of the ion beam illustrated in FIG. 9, there can be derived such a relationship between the ratio $\Delta x/\Delta y$ and the incident angle $\theta_1$ which is illustrated in FIG. 12. It can be seen that $\theta_1$ has to be equal or greater than 20° in order that the ratio $\Delta x/\Delta y$ be smaller than 1 (one).

It has been confirmed that a preferable configuration of the thin film magnetic head can be embodied by the etching process effected on the two conditions mentioned above. Of course, the etching process may be supplemented by a conventional mechanical cutting process. In this case, by restricting the mechanical processing to such a limit that injuries as involved can be neglected, the time required for the whole process may be significantly reduced.

As will be appreciated from the foregoing description, the present invention has now provided a thin film magnetic head which enjoys high recording/reproducing performance and efficiency as well as a method which is capable of manufacturing the thin film magnetic head with an improved yield.

In the foregoing description, it has been assumed that Sendust is used as the magnetic material for the thin films. However, it goes without saying that the invention can equally be applied to the thin film magnetic head in which the magnetic thin films are formed of other magnetic metals such as Permalloy, or amorphous magnetic materials which contain iron, cobalt and nickel as main components.

We claim:

1. A thin film magnetic head, comprising a substrate formed of a non-magnetic material, a first magnetic thin film formed on the substrate, a non-magnetic thin film formed on a part of the first magnetic thin film for forming a magnetic head gap, and a second magnetic thin film in contact with the non-magnetic thin film, a first groove formed, in a predetermined region of the first magnetic thin film, which has a depth reaching the non-magnetic substrate and is filled with the non-magnetic thin film and the second magnetic thin film, one portion of the first magnetic thin film located on one side of said first groove constituting a main magnetic path for a half of a magnetic head core, a wall of which constitutes a surface of the magnetic head gap, while the other portion of the first magnetic thin film located on the other side of said first groove constitutes an auxiliary magnetic path for the other half of said magnetic head core, the non-magnetic thin film being provided on at least the surface of the magnetic head gap, the second magnetic thin film being formed on the first magnetic thin film, and a further groove being formed in the second magnetic thin film, whose depth at the position of the magnetic head gap reaches at least the surface of said one portion of the first magnetic thin film, and the second magnetic thin film having one portion which is positioned on said one portion of the first magnetic film and constitutes an auxiliary magnetic path for the half of said magnetic core, and the other portion which is positioned on said other portion of the first magnetic film constituting a main magnetic path for the other half of said magnetic head core, whereby the magnetic head gap is formed between opposite end faces of said main magnetic path portions of the two magnetic thin films with the non-magnetic thin film being sandwiched between said opposite end faces.

2. A thin film magnetic head comprising: a substrate formed of a non-magnetic material; a first magnetic thin film formed on said substrate; a groove formed in said first magnetic thin film at a predetermined region and provided with two walls reaching said non-magnetic substrate; a non-magnetic thin film formed on one wall of said groove; and a second magnetic thin film filled in said groove, wherein said non-magnetic thin film formed on one of said walls provides a magnetic head gap of the magnetic head and said first and second magnetic thin films located on both sides of said magnetic head gap provide core components of the magnetic head.

3. A thin film magnetic head according to claim 2, wherein said first and magnetic thin film is composed of at least two layers of thin films.

4. A thin film magnetic head according to claim 2 or 3, wherein cross-section of said groove presents a V-like shape.

5. A thin film magnetic head according to claim 2 or 3, wherein said first and second magnetic thin films are formed of a magnetic material selected from the group consisting of Sendust, Permalloy and amorphous material containing iron, cobalt and nickel as primary components.

6. A thin film magnetic head, comprising: a substrate formed of a non-magnetic material; a first magnetic thin film formed on a surface of said substrate and having a first groove of which one wall surface constitutes a magnetic gap surface and which has a depth reaching to at least said surface of the substrate so that a portion of said first magnetic thin film located on one side of said first groove constitutes a main magnetic path for a half of a magnetic head core, while the other portion of said first magnetic thin film located on the other side of said first groove constitutes an auxiliary magnetic path for the other half of said magnetic head core; a non-magnetic thin film formed on at least one wall surface of said first groove; a second magnetic thin film formed on said first magnetic thin film deposited with said non-magnetic thin film and having a second groove whose depth at the position of said magnetic head gap reaches at least the surface of the portion of said first magnetic thin film which constitutes said main magnetic path, said second magnetic thin film having one portion which constitutes an auxiliary magnetic path for the half of said magnetic head core and the other portion which constitutes a main magnetic path for the other half of said magnetic head core, said second groove being interposed between said one and other portions of said second magnetic thin film, wherein the magnetic head gap is formed between opposite end faces of said main magnetic path portions of said first and second magnetic thin films with said non-magnetic thin film being sandwiched between said opposite end faces.

7. A thin film magnetic head according to claim 6, wherein at least one of said first and second magnetic thin films is composed of two or more layers of laminar films.

8. A thin film magnetic head according to claim 6 or 7, wherein said first groove is of a V-like cross-section.

9. A thin film magnetic head according to claim 8, wherein said V-like groove has a wall face which is disposed in opposition to the wall face constituting a part of said magnetic head gap with an angle of inclination not greater than 20° to said substrate.

10. A thin film magnetic head comprising a substrate formed on a non-magnetic material; a first magnetic thin film formed on said substrate; a groove formed in said first magnetic thin film at a predetermined region and having two walls the extend to said non-magnetic substrate; a non-magnetic thin film formed on at least one said two walls of said groove; and a second magnetic thin film filled in said groove over said non-magnetic thin film, said non-magnetic thin film formed on at least one of said walls of the groove providing a magnetic head gap of the magnetic head and said first and second magnetic thin films located on each side of a magnetic head gap providing core components of the magnetic head.

* * * * *